United States Patent
Gandhi et al.

(10) Patent No.: US 9,087,039 B2
(45) Date of Patent: Jul. 21, 2015

(54) LANGUAGE INDEPENDENT PROBABILISTIC CONTENT MATCHING

(75) Inventors: Mauktik Gandhi, Redmond, WA (US); Charles Lamanna, Bellevue, WA (US); Vidyaraman Sankaranarayanan, Redmond, WA (US); Raimundo Pontes Filho, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 380 days.

(21) Appl. No.: 13/367,469

(22) Filed: Feb. 7, 2012

(65) Prior Publication Data

US 2013/0204609 A1     Aug. 8, 2013

(51) Int. Cl.
*G06F 17/27* (2006.01)

(52) U.S. Cl.
CPC .................................... *G06F 17/27* (2013.01)

(58) Field of Classification Search
CPC ............................ G06F 17/27; G10L 15/1822
USPC ...................................... 704/244, 9
See application file for complete search history.

(56) References Cited

U.S. PATENT DOCUMENTS

| | | | |
|---|---|---|---|
| 5,958,005 A | 9/1999 | Thorne et al. | |
| 6,006,242 A | 12/1999 | Poole et al. | |
| 6,104,990 A | 8/2000 | Chaney et al. | |
| 6,148,297 A | 11/2000 | Swor et al. | |
| 6,308,148 B1 | 10/2001 | Bruins et al. | |
| 6,629,081 B1 | 9/2003 | Cornelius et al. | |
| 6,678,409 B1 | 1/2004 | Wu et al. | |
| 6,826,609 B1 | 11/2004 | Smith et al. | |
| 6,850,252 B1 | 2/2005 | Hoffberg | |
| 6,968,308 B1* | 11/2005 | Brockett et al. | 704/9 |
| 7,181,017 B1 | 2/2007 | Nagel et al. | |
| 7,454,778 B2 | 11/2008 | Pearson et al. | |
| 7,483,977 B2 | 1/2009 | Mikhailov et al. | |
| 7,533,420 B2 | 5/2009 | Battagin et al. | |
| 7,610,233 B1 | 10/2009 | Leong et al. | |
| 7,738,900 B1 | 6/2010 | Manroa et al. | |
| 7,787,863 B2 | 8/2010 | van de Groenendaal | |
| 7,797,010 B1 | 9/2010 | Manroa et al. | |
| 7,853,472 B2 | 12/2010 | Al-Abdulqader et al. | |
| 7,876,335 B1 | 1/2011 | Pittenger et al. | |

(Continued)

FOREIGN PATENT DOCUMENTS

| | | |
|---|---|---|
| KR | 10-2006-0050444 A | 5/2006 |
| KR | 10-2006-0065480 A | 6/2006 |
| KR | 10-2011-0068072 A | 6/2011 |

OTHER PUBLICATIONS

Paukkeri, et al., "A Language-Independent Approach to Keyphrase Extraction and Evaluation", Retrieved at <<http://www.aclweb.org/anthology/C/C08/C08-2021.pdf>>, In Proceeding of the 22nd International Conference on Computational Linguistics, COLING, Aug. 2008, pp. 83-86.

(Continued)

*Primary Examiner* — Jakieda Jackson
(74) *Attorney, Agent, or Firm* — Louise Bowman; Jim Ross; Micky Minhas

(57) ABSTRACT

Content is received and compared against rules for identifying a type of content. Each rule has both segmented and unsegmented patterns. The content is matched against the patterns and assigned a confidence score that is higher if the content matches a segmented pattern and lower if the content matches an unsegmented pattern.

19 Claims, 12 Drawing Sheets

(56) References Cited

U.S. PATENT DOCUMENTS

| | | | |
|---|---|---|---|
| 7,903,549 B2 | 3/2011 | Judge et al. | |
| 7,913,167 B2 | 3/2011 | Cottrille | |
| 8,117,022 B2 * | 2/2012 | Linker | 704/9 |
| 8,140,664 B2 | 3/2012 | Huang et al. | |
| 8,151,200 B2 | 4/2012 | Roger et al. | |
| 8,161,526 B2 | 4/2012 | Corrao et al. | |
| 8,316,049 B2 | 11/2012 | Saito | |
| 8,316,237 B1 | 11/2012 | Felsher et al. | |
| 8,346,532 B2 | 1/2013 | Chakra et al. | |
| 8,396,838 B2 | 3/2013 | Brockway et al. | |
| 8,539,349 B1 * | 9/2013 | Kirshenbaum | 715/264 |
| 8,880,989 B2 | 11/2014 | Tanzer et al. | |
| 2001/0018746 A1 | 8/2001 | Lin | |
| 2001/0028364 A1 | 10/2001 | Fredell et al. | |
| 2003/0074354 A1 | 4/2003 | Lee et al. | |
| 2003/0105734 A1 | 6/2003 | Hitchen et al. | |
| 2004/0205531 A1 | 10/2004 | Innes et al. | |
| 2004/0243408 A1 | 12/2004 | Gao et al. | |
| 2004/0260697 A1 * | 12/2004 | Ohnuma et al. | 707/5 |
| 2006/0048224 A1 | 3/2006 | Duncan et al. | |
| 2006/0094400 A1 | 5/2006 | Beachem et al. | |
| 2006/0120526 A1 | 6/2006 | Boucher et al. | |
| 2006/0129942 A1 | 6/2006 | McCary | |
| 2006/0253275 A1 | 11/2006 | Parkinson et al. | |
| 2006/0272024 A1 | 11/2006 | Huang et al. | |
| 2007/0168666 A1 | 7/2007 | Craigie | |
| 2007/0261099 A1 | 11/2007 | Broussard et al. | |
| 2008/0027910 A1 | 1/2008 | Wen et al. | |
| 2008/0052395 A1 | 2/2008 | Wright et al. | |
| 2008/0104381 A1 | 5/2008 | Peacock et al. | |
| 2008/0201376 A1 | 8/2008 | Khedouri et al. | |
| 2008/0221882 A1 * | 9/2008 | Bundock et al. | 704/235 |
| 2008/0302870 A1 | 12/2008 | Berini et al. | |
| 2008/0310718 A1 | 12/2008 | Balchandran et al. | |
| 2009/0019121 A1 | 1/2009 | Mears | |
| 2009/0070881 A1 | 3/2009 | Yellepeddy et al. | |
| 2009/0119372 A1 | 5/2009 | Callanan et al. | |
| 2010/0036779 A1 | 2/2010 | Sadeh-Koniecpol et al. | |
| 2010/0063923 A1 | 3/2010 | Lundberg et al. | |
| 2010/0076957 A1 | 3/2010 | Staddon et al. | |
| 2010/0095349 A1 | 4/2010 | Motoyama | |
| 2010/0169771 A1 | 7/2010 | Pelegrin et al. | |
| 2010/0174528 A1 * | 7/2010 | Oya et al. | 704/10 |
| 2010/0180213 A1 | 7/2010 | Karageorgos et al. | |
| 2010/0306139 A1 | 12/2010 | Wu et al. | |
| 2011/0060747 A1 | 3/2011 | Rose et al. | |
| 2011/0078587 A1 | 3/2011 | Guy et al. | |
| 2011/0148938 A1 | 6/2011 | Yang | |
| 2011/0166918 A1 | 7/2011 | Allaire et al. | |
| 2012/0114119 A1 * | 5/2012 | Ahuja et al. | 380/44 |

OTHER PUBLICATIONS

Bracewell, et al., "Multilingual Single Document Keyword Extraction for Information Retrieval", Retrieved at <<http://ieeexplore.ieee.org/stamp/stamp.jsp?tp=&arnumber=1598792>>, Proceedings of IEEE International Conference on Natural Language Processing and Knowledge Engineering, 2005, pp. 518-522.

"International Search Report", Mailed Date: Jun. 14, 2013, Application No. PCT/US2013/024244, Filed Date: Feb. 1, 2013, pp. 9.

Charbonneau, Stephane. "The role of user-driven security in data loss prevention." Computer Fraud & Security 2011.11 (2011): 5-8.

International Search Report and written Opinion for International Application No. PCT/US2013/023037, Filing date: Jan. 25, 2013, 7 pages.

"Proofpoint Enterprise Privacy for Data Loss Prevention", Retrieved at <<http://www.proofpoint.com/products/privacy/index.php>>, Retrieved Date: Jan. 13, 2012, 2 pages.

"The Anti-Spam & Email Security Platform A Solution for Every Organization", Retrieved at <<http://www.sonicwall.com/us/products/376.html>>, Retrieved Date: Jan. 13, 2012, 2 pages.

Prosecution History for U.S Appl. No. 13/361,501 including: Issue Notification dated Oct. 15, 2014, Notice of Allowance dated Jul. 8, 2014, Amendment RCE dated Mar. 27, 2014, Final Office Action dated Nov. 27, 2013, Amendment dated Sep. 30, 2013, Non Final Office Action dated May 24, 2013, and Application filed Jan. 30, 2012. 112 pages.

Application and Drawings from U.S. Appl. No. 14/508,407, filed Oct. 7, 2014. 50 pages.

Office Action from U.S. Appl. No. 14/508,407 dated Jan. 15, 2015, 20 pages.

* cited by examiner

LANGUAGE INDEPENDENT PROBABILISTIC CONTENT MATCHING

BACKGROUND

Many languages, such as the English language, have words separated by white spaces in text. In these types of languages, any technology that requires words to be identified in text is fairly straight forward. The white spaces are known delimiters between adjacent words. These types of languages are referred to as space-delimited languages or segmented languages.

However, other languages, such as Chinese, Japanese, Korean and Vietnamese, for instance, are written simply as a sequence of evenly spaced characters. These languages do not have a clear separation between words, in that they do not have spaces between the words. These types of languages are referred to as non-segmented languages. Lack of a known delimiter in non-segmented languages makes precise detection of, for example, key words, quite difficult.

Similarly, in non-segmented languages, the exact same characters can mean different things, based upon the surrounding context. By way of example, the following text:

输入信用卡号码。

Has a word segmentation, which is translated in Table 1 below:

TABLE 1

| 输入 | 信用卡 | 号码 | 。 |
|---|---|---|---|
| Input | Credit-Card | Number | (End-of-sentence punctuation) |

However, the following text

周倩用卡车运货。 has the translation shown in Table 2 below:

TABLE 2

| 周倩 | 用 | 卡车 | 运货 | 。 |
|---|---|---|---|---|
| Zhou Xing (a person's name) | drove | his truck | To haul goods | (End-of-sentence punctuation) |

It can be seen that the text in Table 2 contains the same character sequence (highlighted) that is translated in the first example as "credit-card" but it has a completely different meaning and has nothing to do with credit cards.

In addition, in non-segmented languages, line breaks can occur in various places that make it even more difficult to identify keywords in the character sequence.

This can be problematic in a variety of different fields. For instance, there are currently a variety of different sources of policies and regulations that govern the dissemination of personal information. Organizations that deal with certain types of information are required to be in compliance with all these regulations. The regulations can be external regulations which come from the government, for example, or internal regulations that govern how certain types of information can be disseminated within a company.

Often, the content that is subject to these regulations and policies is operated on by information workers who have a handbook that contains a large volume of regulations or policies (both internal and external), and the worker is expected to know and comply with all of them. In enforcing these policies, some systems attempt to identify sensitive information in documents being worked on by the information workers. In doing so, those systems often attempt to examine words in the documents to determine whether a given document is sensitive. For instance, a keyword such as "credit card" is seen as an indication of sensitive content. However, as discussed above, this is very difficult to identify in non-segmented languages.

The discussion above is merely provided for general background information and is not intended to be used as an aid in determining the scope of the claimed subject matter.

SUMMARY

Content is received and compared against rules for identifying a type of content. Each rule has both segmented and unsegmented patterns. The content is matched against the patterns and assigned a confidence score that is higher if the content matches a segmented pattern and lower if the content matches an unsegmented pattern.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
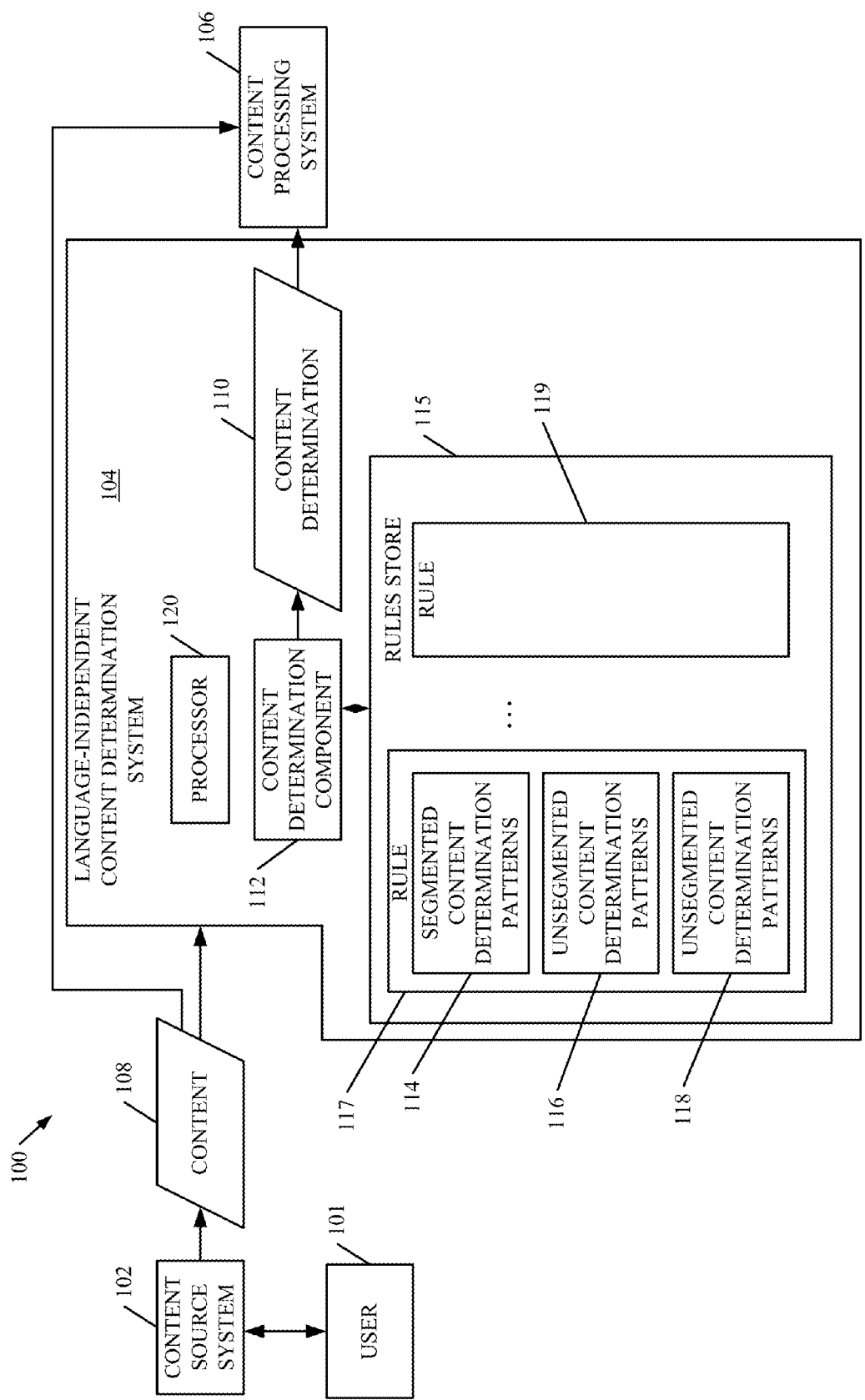
FIG. 1 is a block diagram of one illustrative embodiment of a language-independent content determination system.

FIG. 1 is a block diagram of a content processing environment 100 that includes a content source system 102, language-independent content determination system 104 and content processing system 106. In the embodiment shown in FIG. 1, system 104 receives content 108 from source system 102 and determines the nature of the content 108 and provides a content determination 110, indicative of the nature of content 108, to content processing system 106. Content processing system 106 processes the content based upon its nature, as identified by content determination 110.

For purpose of the present description, language-independent content determination system 104 will be described as determining whether content 108 is sensitive content so that it is subject to data dissemination policies. For instance, where content 108 is an electronic mail message, there may be data dissemination policies that govern whether that content can be sent to individuals outside of a company (such as where it contains intellectual property content). In addition, the data dissemination policies may govern dissemination of the content where it contains personal information, such as credit card information, social security numbers, etc. In addition, however, there may also be internal data dissemination policies that govern dissemination of content 108 if it contains vulgar language. Therefore, the present description will proceed with respect to system 104 determining whether content 108 is sensitive so that data dissemination policies can be applied to it.

However, it will be noted that simply because system 104 is described as determining whether content 108 is sensitive, that is only one example of how system 104 may be used. System 104 can be used to identify whether the content 108 has a different nature as well. For instance, system 104 may identify whether the tone of an electronic mail message (content 108) is angry, positive or negative. Similarly, system 104 can be used to determine whether content 108 has a different nature as well. In any case, content processing system 106 processes the content based upon the nature of the content determined by system 104.

It should also be noted that content source system 102 and content processing system 106 can be the same system. For instance, content source system 102 can be an authoring application that is used to author an electronic mail message, a word processing document, a spreadsheet document, a slide show presentation document, a drawing document, or another type of document. Therefore, content 108 can be the body of an electronic email message, an attachment, or any other type of document that could be created by content source system 102. Content processing system 106 can be incorporated in content source system as well, so that the content generated by user 101 in content source system 102 has data dissemination policies applied to it by the same system.

By way of example, assume that content source system 102 is an electronic mail system and that user 101 interacts with system 102 to generate an electronic mail message which comprises content 108. The user 101 can interact using user input mechanisms such as a keyboard, point and click device, voice, touch gesture or other mechanisms. In any case, system 104 can determine whether the mail message contains sensitive material and, if so, content processing system 106 can be incorporated into the electronic mail system (that comprises content source system 102) to implement data dissemination policies with respect to the sensitive material. That is, the electronic mail system (used to author the content) may block certain electronic mail messages based on the content, or based on the recipient, or both. Similarly, other data dissemination policies can be employed as well.

In any case, language-independent content determination system 104 includes a content determination component 112 and a rule store 115 that includes a set of content determination rules 117 and 119. Each rule 117, 119 is used to identify a certain kind of sensitive information. For instance, rule 117 can be used to identify credit card numbers in content 108 and rule 119 can be used to identify social security numbers. These are examples only. Each rule illustratively specifies patterns. If the content 108 matches a pattern in a rule, then it is determined that the content contains the sensitive information corresponding to the rule. In the embodiment shown in FIG. 1, each rule includes segmented content determination patterns 114, and unsegmented content determination patterns 116. FIG. 1 shows an embodiment in which rule 117 also has another set of unsegmented content determination patterns 118. In the embodiment shown, patterns 114 operate on segmented languages and patterns 116 and 118 operate on unsegmented languages. Of course, segmented and unsegmented languages can be combined as well. For instance, patterns 114 may operate on the English language only, or on all segmented languages. Similarly, patterns 116 can operate on Japanese and patterns 118 can operate on Chinese, while other sets of patterns can be provided for other segmented languages. Alternatively, a set of unsegmented patterns 116 can be provided and arranged so that the set of patterns 116 operates on all unsegmented languages. This is described in greater detail below.

System 104 also illustratively includes processor 120. Processor 120 is illustratively a computer processor with associated timing and memory circuitry (not shown). Processor 120 is illustratively a functional component of system 104 and is activated by the other components of system 104 to facilitate the functionality of those components.

It will also be noted, of course, that while the environment 100 is shown broken into various systems and components, the functionality of those systems and components can be combined with one another to have fewer systems or components, or they can be further divided out to have additional systems and components. The ones shown in FIG. 1 are for the sake of example only.

Figure 2:
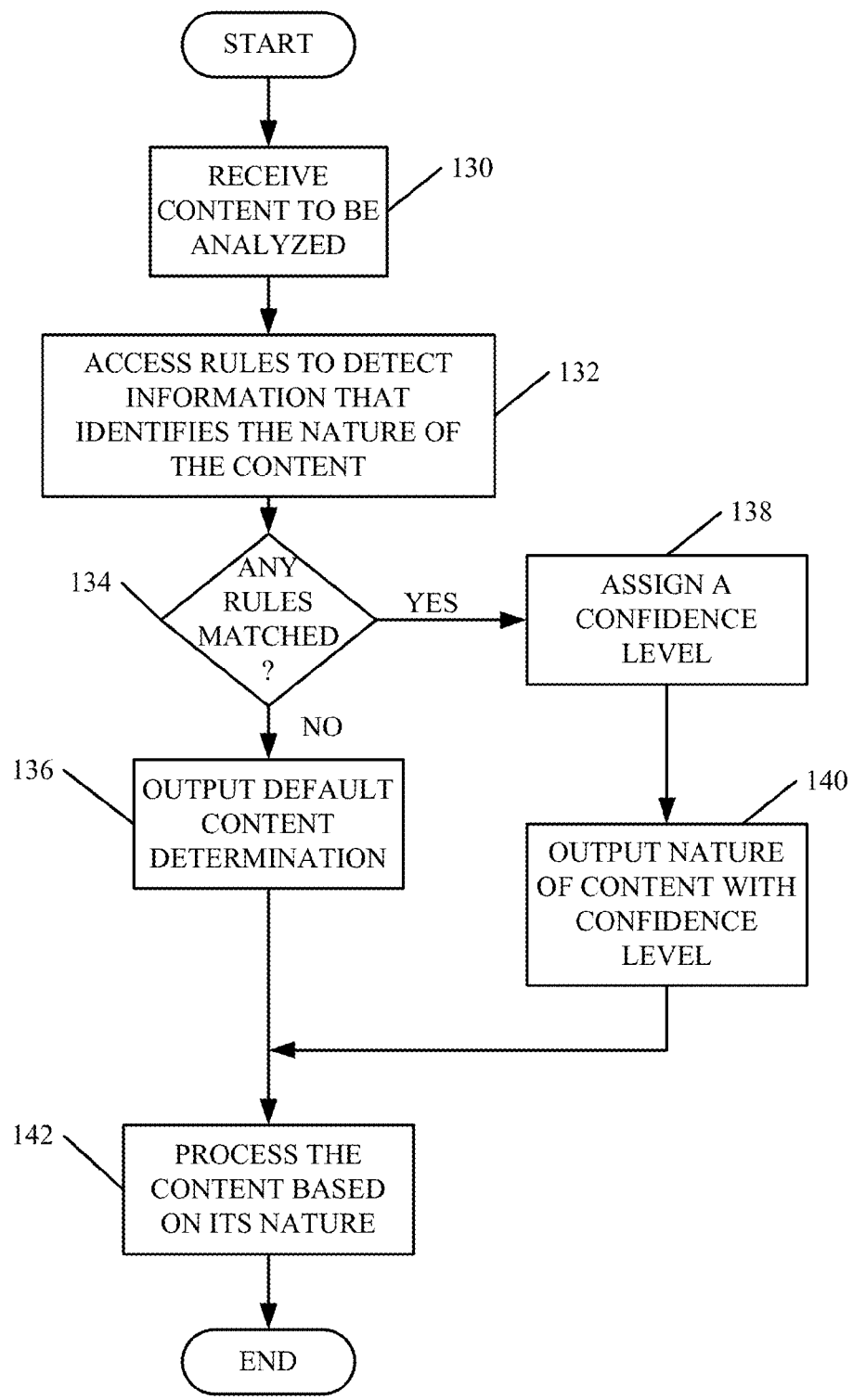
FIG. 2 is one embodiment of a flow diagram illustrating the operation of the system shown in FIG. 1.

FIG. 2 is a flow diagram illustrating one embodiment of the operation of the environment shown in FIG. 1. Language-independent content determination system 104 first receives content 108 to be analyzed. This is indicated by block 130 in FIG. 2. Content determination component 112 accesses the various rules 117-119 to detect information that identifies the nature of content 108. This is indicated by block 132 in FIG. 2.

By way of example, content determination component 112 can access rules 117-119 to see if credit card information resides in content 108. This can be done, for instance, by looking for a 16 digit number closely proximate the words "credit card", "MasterCard", "Visa", or "expiration date".

Content determination component 112 illustratively searches all of the rules 117-119, regardless of the language of content 108, in order to determine whether any of the rules match any of the portions of content 108. Therefore, it can be seen that system 104 can be used to identify the nature of content 108, regardless of its language, and even regardless of whether content 108 contains material in more than one language.

In any case, content determination component 112 then determines whether any of the rules 117-119 match the content 108. This is indicated by block 134 in FIG. 2. If not, then system 104 is unable to identify the nature of content 108 as being sensitive and it simply outputs a default content determination, such as a determination that the content is not sensitive. This is indicated by block 136 in FIG. 2.

However, if, at block 134, content determination component 112 has identified at least one of rules 117-119 that matches content 108, then content determination component 112 can identify the nature of content 108 as being sensitive. Content determination component 112 then assigns a confidence level to that determination, as indicated by block 138 in FIG. 2.

The confidence level can be set in a variety of different ways. For instance, in one embodiment, the rules 117-119 first cause content determination component 112 to determine whether content 108 contains a 16 digit number. If so, then the content 108 matches the pattern defined by that specific rule. However, the rule may also define that content determination component 112 is to look for collaborating evidence such as a date, such as the words "credit card", etc. Based upon the collaborating evidence identified and set out in the matching rule, content determination component 112 can assign a confidence level that varies based upon whether the content matched a segmented or unsegmented pattern and based upon the amount of collaborating data found in content 108 to support the determination that content 108 contains sensitive material.

Content determination component 112 then outputs the nature of content 108, along with the confidence level, as the content determination 110. Outputting the nature of the content with its confidence levels is indicated by block 140 in FIG. 2. By way of example, content determination component 112 can output an indication that content 108 contains sensitive material with a confidence level of 90 percent. Of course, this is exemplary only.

Once content processing system 106 has received the content determination 110, it processes the content 108 based upon the nature of content 108. This is indicated by block 142 in FIG. 2. Content processing system 106 can process content 108 using different rules, depending on whether the content is sensitive.

By way of example, if content 108 is an electronic mail message and either the body of the message contains sensitive content, or an attachment to the message contains sensitive content, then content processing system 106 may simply display a message indicating that the content 108 contains sensitive material and instructing the user 101 how to proceed (such as by indicating that it should only be sent to authorized personnel). Alternatively, content processing system 106 may indicate that the electronic mail message will be blocked, because it contains sensitive material. Of course, content processing system 106 can also analyze the recipients of the content 108 to determine what actions to take, such as to block the electronic mail message or to send it, etc. In any case, content processing system 106 processes the content 108 based upon the nature of content 108 output by system 104.

Figure 3:
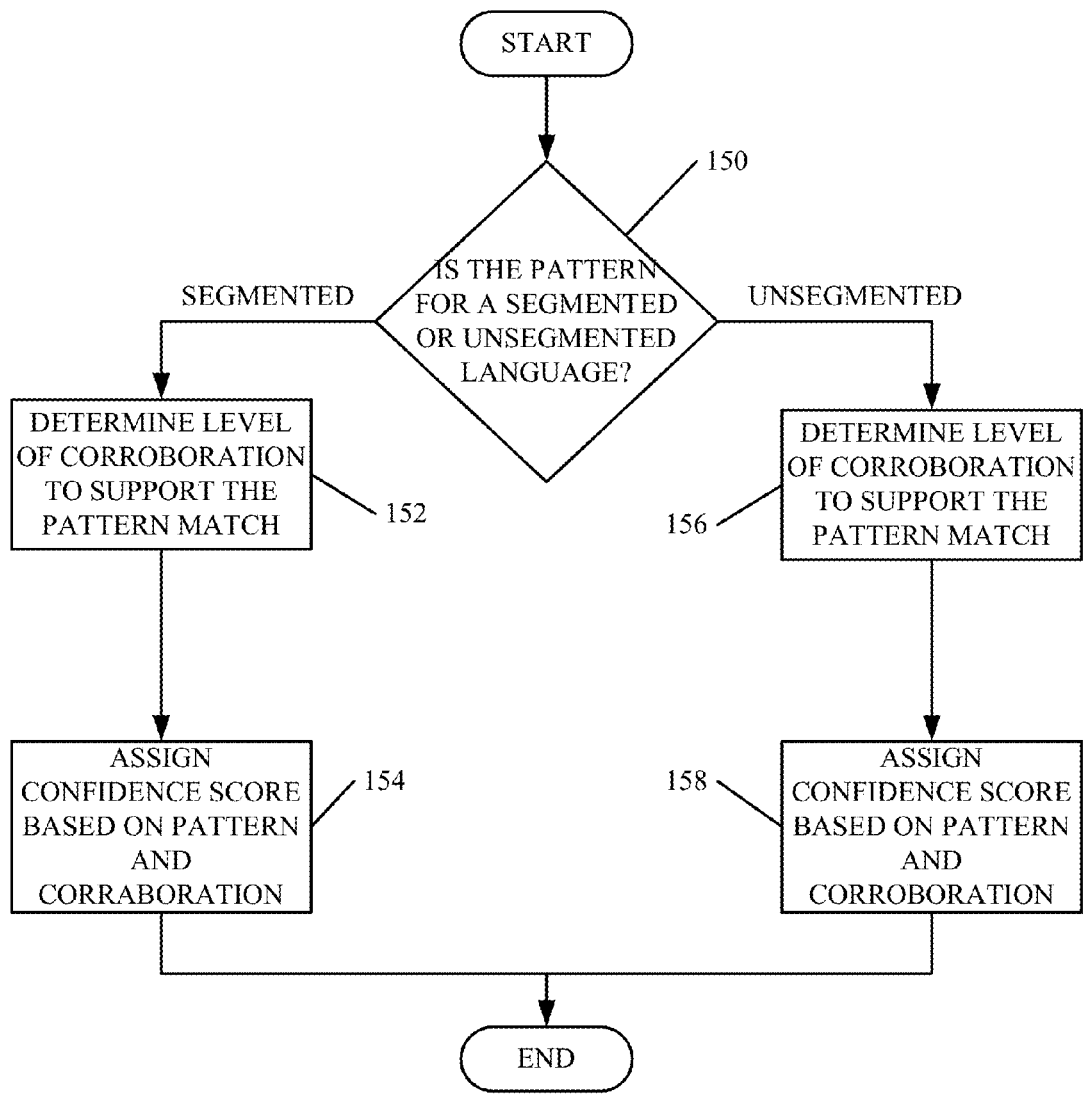
FIG. 3 is a more detailed block diagram indicating how a confidence level is assigned.

FIG. 3 is a more detailed block diagram illustrating how content determination component 112 assigns a confidence level to the content determination 110. In the embodiment shown in FIG. 3, content determination component 112 first determines whether the pattern matched on a given rule is for a segmented or unsegmented language. This is indicated by block 150 in FIG. 3.

If the matched rule is for a segmented language, such as the English language, then this influences the confidence level assigned. For instance, because segmented languages have clearly delimited words (which are separated by white spaces) then any key words that are matched as part of the rule can be matched with a higher degree of confidence than they could be if they were matched in an unsegmented language. As discussed above, even if a string of characters in an unsegmented language is matched, precisely, that string can mean completely different things based upon its context. Component 112 is thus less certain that the character string means the same thing in the rule and in the content 108.

Therefore, content determination component 112 then determines the level of corroboration that has been found to support the pattern that was matched for the given rule. This is indicated by block 152. Component 112 then assigns the confidence score based on the pattern that was matched and the corroboration that was identified. This is indicated by block 154.

By way of a specific example, assume that the rule for the segmented language that has been matched is looking for credit card information. In one embodiment, the rule first requires that content 108 match a main pattern that specifies that content 108 must contain a 16 digit number. Assume further that content 108 does contain a 16 digit number. Therefore, the pattern required by the rule in the segmented language has been matched. Now assume that, in order to find corroborating evidence, the rule includes a corroborating pattern portion that contains certain key words that might also exist in content 108, in addition to the 16 digit number. Such keywords can include "credit card", "expiration date", etc. Content determination component 112 then determines whether any of the corroborating data is matched in content 108. Because the pattern that has been matched corresponds to a segmented language, content determination component 112 can be very confident that the words in the corroborating data mean the same thing both in the pattern and in the content 108. That is, if one of the keywords in the rule is "credit card" and content determination component 112 finds the words "credit card" in content 108, content determination component 112 can be very confident that the previously matched 16 digit number is, in fact, a credit card number. If content determination component 112 also finds the words "expiration date" in content 108, the confidence level is even higher. Based upon the main pattern that was matched in the rule and the corresponding corroborating pattern, the confidence level is assigned.

Alternatively, if at block 150 it is determined that the pattern for the matching rule corresponds to an unsegmented language, then content determination component 112 again looks for corroborating data to support the matched pattern. This is indicated by block 156 in FIG. 3. However, unlike the segmented languages, even if content determination component 112 matches keywords as corroborating data, it cannot be as certain in the unsegmented languages that the keywords mean the same thing in the rule as they do in content 108. Therefore, while locating corroborating data in content 108 does increase the confidence level even for an unsegmented language, it may not increase the confidence level as much as for a segmented language.

By way of specific example, assume that the pattern for the unsegmented language also requires that content 108 contain a 16 digit number. Assume further that content 108 does contain a 16 digit number. Then, assume that the pattern asks content determination component 112 to look for a character string in content 108 that, when translated, corresponds to the English words "credit card". Even if content determination component 112 does locate that character string in content 108, that does not mean that the character string has the meaning "credit card". In fact, it may have a completely different meaning in the context of content 108, that has nothing to with credit cards. This was illustrated above in the Background section. Therefore, while content determination component 112 does increase the confidence level of its determination, it may not increase it as much as it does in the case of a segmented language. In any case, however, the confidence score is assigned based on the pattern matched in the rule, and the corroborating data identified. This is indicated by block 158 in FIG. 3.

Figure 4:
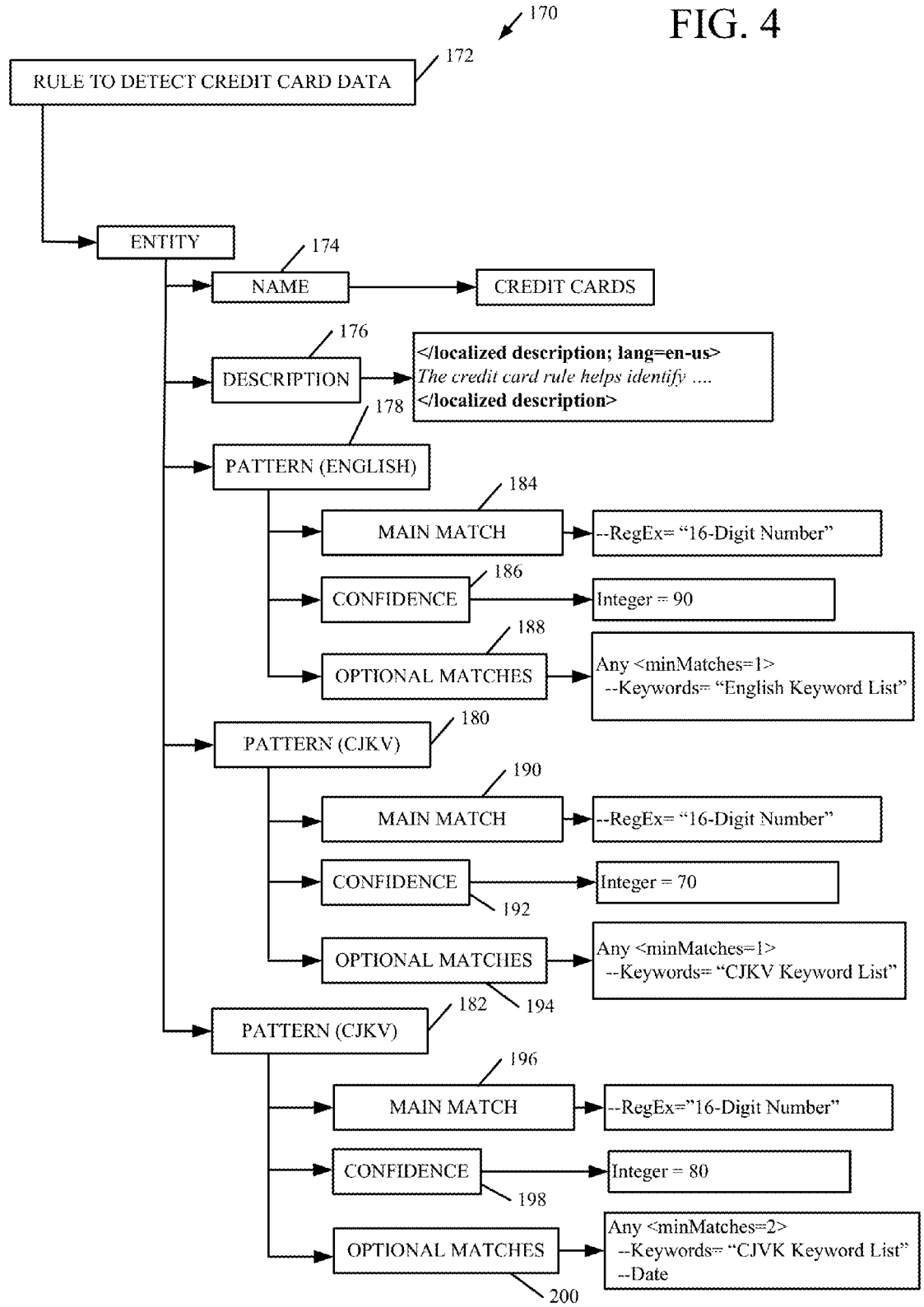
FIG. 4 is one embodiment of a rule tree that defines a rule that can be used for identifying credit card data in content.

FIG. 4 shows a hierarchical tree structure 170 that is used to define a rule for detecting credit card data within a body of content such as content 108. Structure 170 includes a head node 172 that indicates that the rule is used to detect credit card data. The name node 174 names the particular rule (in this case it is named "credit card") and description node 176 describes what the rule does. In this case, it includes a textual description that describes that the rule attempts to identify content that contains credit card information, and it can also describes how to protect this information when the credit card information is detected.

Structure 170 then contains three pattern nodes 178, 180 and 182. Pattern node 178 defines a set of patterns and corroborative data that can be used to identify credit card data in a segmented language. Node 178 includes a set of child nodes

184, 186 and 188 that further define the pattern. Node 184 shows that, for the rule to be matched, a regular expression, in the form of a 16 digit number, is to be found in the content. If the regular expression is found, then corroborating node 188 identifies optional matches that can be used to corroborate a determination that the 16 digit number is a credit card number. In one embodiment, node 188 includes a list of key words that are related to credit cards, and that are set out in one or more segmented languages (such as the English language) represented by node 178. Again, by way of example, the keywords can include "credit card", "Visa", "Master Card", "expiration date", etc. Confidence node 186 defines a confidence level that is associated with content where the 16 digit number has been identified and where at least one of the optional matches has been identified. If more than one of the optional matches (or corroborating matches) has been identified, then confidence level 186 can specify additional confidence levels that identify increasing confidence. Thus, node 186 specifies to content determination component 112 what confidence level is to be assigned to the sensitivity determination made when the given rule and corroborative data has been matched at node 178.

Node 180 also includes a plurality of child nodes 190, 192 and 194. Main match node 190 again specifies a pattern that is to be matched for the rule corresponding to node 182 fire. In the embodiment shown in FIG. 4, the pattern is a regular expression which comprises a 16 digit number.

Optional (or corroborating) match node 194 defines corroborative evidence that can be matched to arrive at a confidence level that supports the matched pattern. In the embodiment shown in FIG. 4, the optional matches 194 include a list of keywords in one or more non-segmented languages. Of course, that list will simply be composed of a list of character stings can be ambiguous in meaning, depending on their context within the content under analysis. Therefore, the pattern corresponding to node 180 indicates that, even if the regular expression at node 190 is matched, and at least one keyword in node 194 is matched, the confidence level identified at confidence node 192 is only 70 percent, while it was 90 percent for the segmented language pattern at node 186. Therefore, even though the same types of matches have occurred in the segmented and non-segmented languages, the confidence level corresponding to the non-segmented language is lower because the corroborating evidence is less certain.

Node 182 also includes a plurality of child nodes 196, 198 and 200. The parameters defined by the pattern corresponding to node 182 are similar to those shown for node 180. Therefore, there is a main match node 196 which defines a regular expression as a 16 digit number which is to be matched in the content 108 in order for the rule to fire. However, the optional matches node 200 includes two different types of information that can be located in content 108. The first is similar to that shown at node 194. That is, a set of key words in one or more non-segmented languages are listed. If any of those keywords are located in content 108, they serve as corroborative data. However, optional matches node 200 also states that corroborating evidence can comprise a date. For example, it is very common when talking about credit card information to include expiration dates. Therefore, if a 16 digit number is located in the content, and a specific non-segmented keyword is located in the content 108, and a date is located in that content, then the confidence that the information is credit card information can be increased. Therefore, even though it is for a non-segmented language, the confidence level expressed by node 198 is 80 percent. This is because even though the keyword matches are less certain, they are also corroborated by a date match.

It should be noted that both patterns corresponding to unsegmented languages (corresponding to nodes 180 and 182 in FIG. 4) can include a list of keywords in all unsegmented languages that are addressed by system 104. That is, the set of keywords in the optional match nodes 194 and 200 can include character strings from Chinese, Japanese, Korean, Vietnamese, etc. Therefore, regardless of which non-segmented language is used in content 108, the matches can be made in both patterns 180 and 182. Similarly, optional match node 188 in the segmented language corresponding to pattern 178 can include words from substantially all segmented languages that the system is intended to operate on. Thus, node 188 can contain a list of keywords in English, French, German, Spanish, etc. Thus, node 178 can operate on all segmented languages.

It will also be noted that the structure 170 set out in FIG. 4 shows only a single rule that has patterns that can be used to operate on all desired languages in order to identify credit cards. This is only one type of structure that can be used, and it only shows one exemplary rule. Further, the main matches and optional matches and confidence levels disclosed are exemplary only. Different ones or additional ones can be used as well.

Figure 4A:
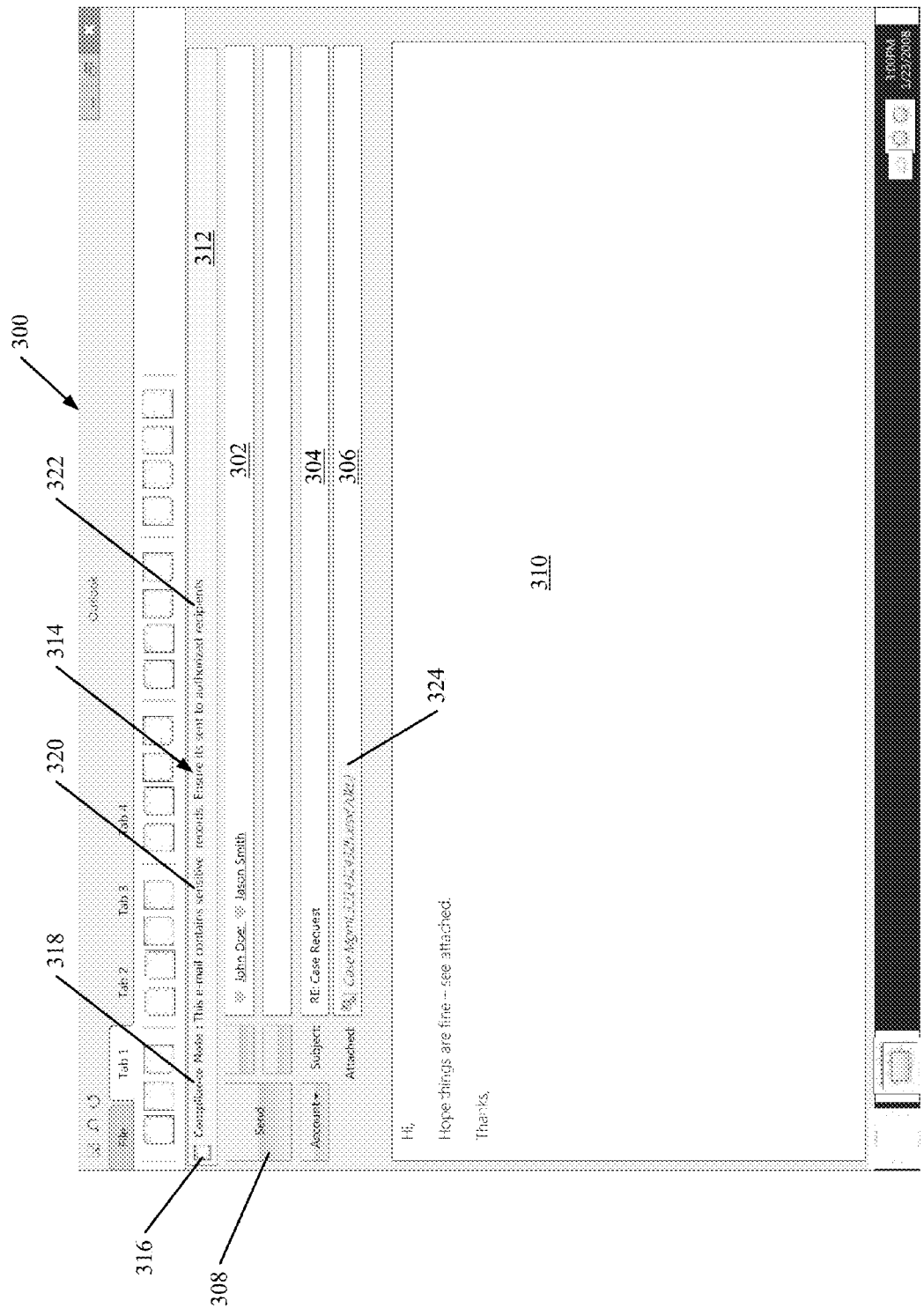
FIGS. 4A and 4B are illustrative user interfaces.
Figure 4B:
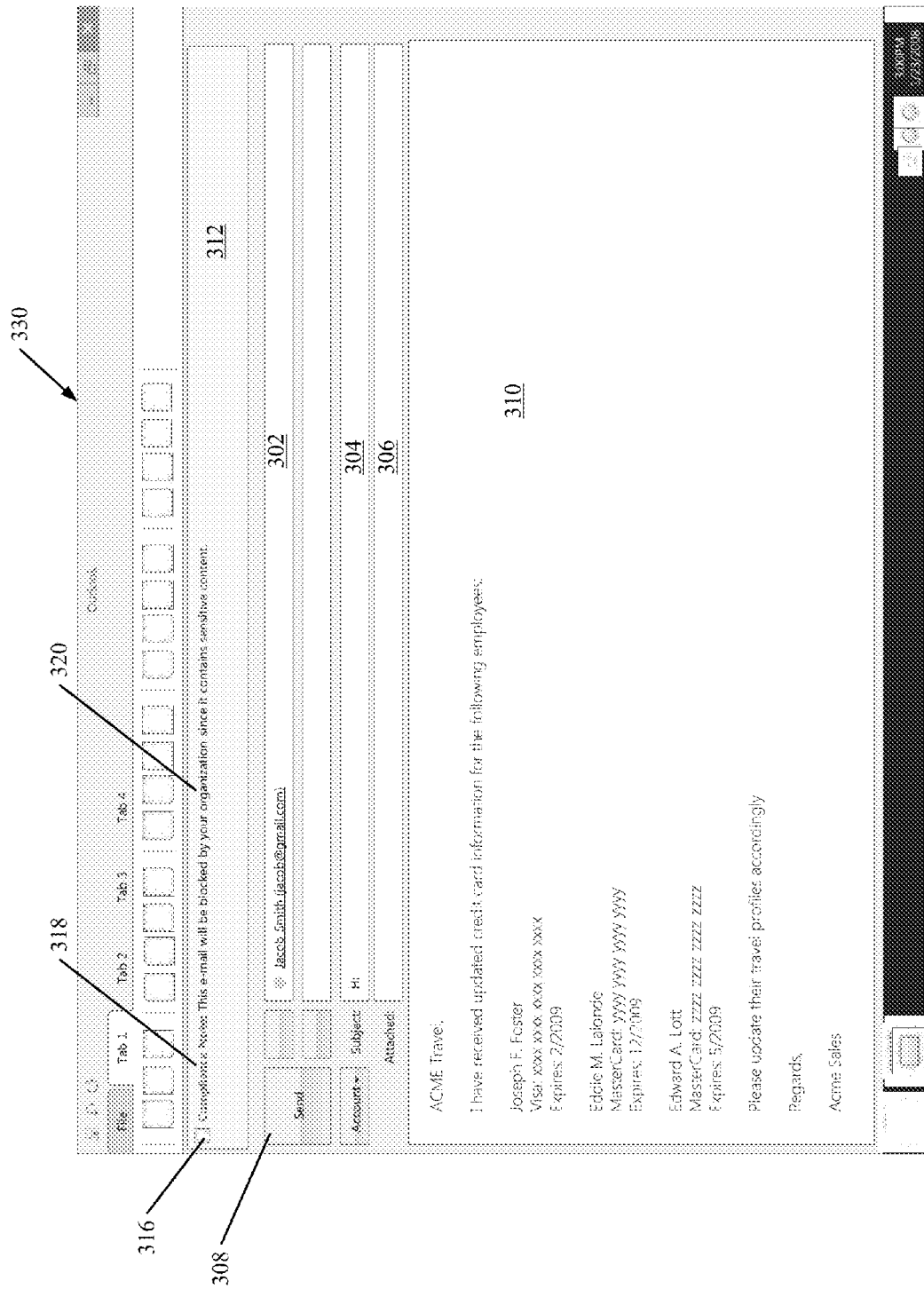

FIGS. 4A and 4B show two specific user interface examples which can be used to enhance understanding. FIG. 4A shows a user interface display 300 in which user 101 is generating an electronic mail message as content 108. The electronic mail message in display 300 illustratively has a recipients portion 302, a subject portion 304, and attachment portion 306, a send button 308, a message body portion 310, and a user education portion 312. In the embodiment shown in FIG. 4A, user 101 has generated a short electronic mail message in body portion 310 and has attached a document within attachment portion 306. There are two recipients, John Doe and Jason Smith, for the electronic mail message.

As the user is generating the electronic mail message (which corresponds to content 108) content determination component 112 is also analyzing content 108 to determine whether it contains sensitive material. When the spreadsheet attachment is attached in portion 306, content determination component 112 also analyzes that attachment.

In the embodiment shown in FIG. 4A, component 112 has analyzed the attachment portion 306 and has found that it contains sensitive records. Therefore, content processing system 106 generates on user interface display 300 the notification 314 in portion 312. Notification 314 includes an icon 316, a heading 318, a description 320 and a warning or instruction 322. Icon 316 can be associated with the compliance note or tip that is displayed in portion 312. It illustratively contains a graphic image of something and that image can change depending on the particular data dissemination policies being mentioned in portion 312. Of course, icon 316 can be a static icon as well.

Heading note portion 318 is simply a heading that indicates that a data dissemination policy is going to be applied to the electronic mail message being authored, or to an attachment. Description portion 320, in this embodiment, states "This e-mail contains sensitive records." Thus, description portion 320 describes the reason that a data dissemination policy is going to be applied to this electronic mail message. Warning or instruction portion 322 states "Ensure it is sent to authorized recipients." This portion instructs the user how to comply with the particular data dissemination policy being implemented. Therefore, in portion 312 in display 300 it can be seen that portion 318 notifies the user that a data dissemination policy is being implemented, and description portion 320 and warning or instruction portion 322 educate user 101 as to the reason that a data dissemination policy is being implemented and as to how to comply with that policy. This is all done in the context of the document itself (the email message and attachment) while the document is being authored and while it is being displayed to user 101.

In the embodiment shown in FIG. 4A, it can also be seen that attachment 324 is highlighted. In one embodiment, the portion of the electronic mail message (content 108) that is sensitive is illustratively indicated by some type of visual cue that distinguishes it on display 300. In the embodiment shown in FIG. 4A, attachment 324 is illustratively highlighted in a different color, such as yellow, than the rest of the user interface display 300. This indicates that attachment 324 is the part of the email that contains the sensitive records mentioned in description portion 320.

FIG. 4B shows another user interface display 330 that can be generated. A number of items on user interface display 330 are similar to those shown in FIG. 4A, and are similarly numbered. A number of differences can be noted, however. It can be seen from FIG. 4B that the sensitive information is contained in the body 310 of the electronic mail message, rather than in an attachment. Therefore, as user 101 is typing the body 310 of the electronic mail message, content determination component 112 is analyzing the content and identifies credit card numbers in body 310. Of course, for the sake of this embodiment, the actual numbers have been replaced by the characters x, y and z. Because the electronic mail message contains sensitive information, a data dissemination policy is applied to the email. In the embodiment shown, description portion 320 in portion 312 describes not only why the data dissemination policy is implemented with respect to this email, but the action that is going to be taken by content processing system 106. The compliance note states "This email will be blocked by your organization since it contains sensitive content." This not only indicates why a data dissemination policy is being implemented (because the email contains sensitive content) but it also educates the user as to what system 106 will be doing with the email because of that policy (blocking it).

Figure 5:
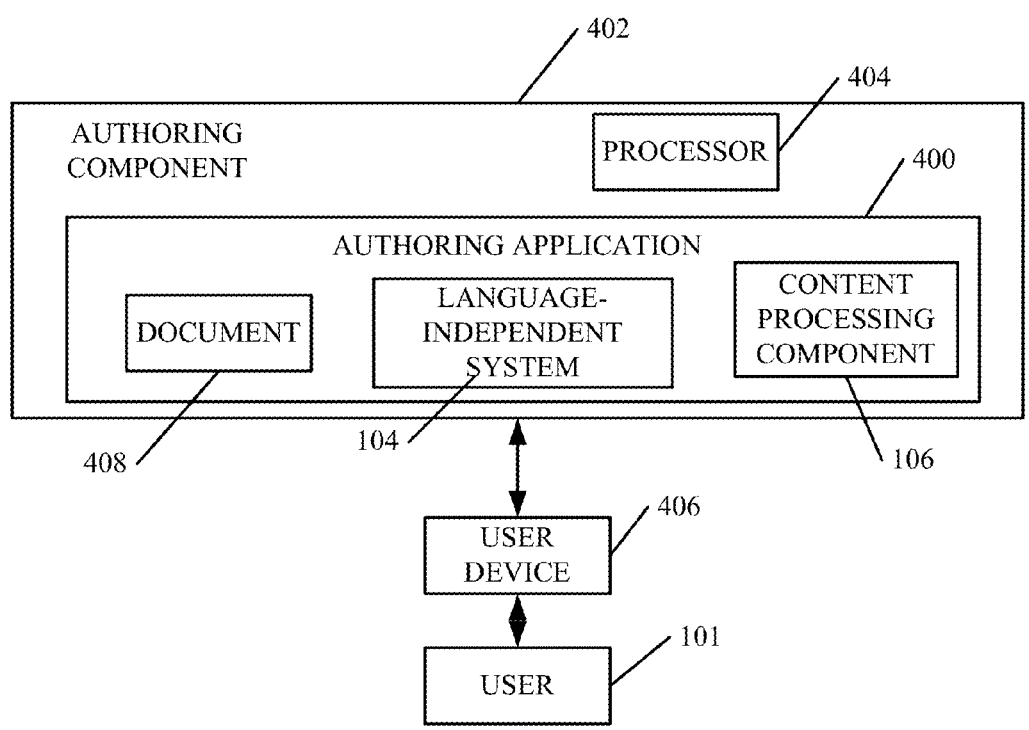
FIG. 5 is a block diagram showing another embodiment of the language-independent content determination system in an authoring system.

FIG. 5 is a block diagram illustrating a more specific embodiment in which language-independent content determination system 104 is deployed within an authoring application 400 that is run within an authoring system 402. Authoring system 402 illustratively includes a processor 404 that is used to run authoring applications so that user 101 can interact with authoring system 402, through a user device 406. User device 406 can be any type of user device, such as a desktop computer, a laptop computer, a palmtop or tablet computer, a mobile device, smart phone, personal digital assistant, multimedia player, etc. By way of one specific example, assume that authoring system 402 is running a word processing authoring application 400 that allows user 101 to generate a word processing document 408 running application 400. In the embodiment shown in FIG. 5, both language-independent content determination system 104 and content processing component 106 are embedded within authoring application 400. Therefore, as user 101 is authoring document 408, system 104 and component 106 are analyzing the content of document 408 to determine its nature (such as whether it is sensitive) and they are processing it accordingly (such as by enforcing data dissemination policies on sensitive information). FIG. 5 is merely provided to show that system 104 and component 106 can be embedded within an application that is used to author content.

It should also be noted that environment 100 can be deployed in a wide variety of different architectures. Different portions of environment 100 can be deployed on a user device 406, or on servers or they can be divided among one or more clients and one or more servers. In addition, portions of environment 100 can be cloud-based services, deployed in a cloud-based architecture.

A cloud computing architecture illustratively include infrastructure, platforms and applications. The cloud services are coupled to other devices or systems such as cloud servers, desktop computers, tablet computers, laptop computers, cellular phones or smart phones or other mobile devices or personal digital assistants. Cloud computing provides computation, software, data access, and storage services, rather than products, that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of environment 100 as well as the corresponding data, can be stored on servers at a remote location in the cloud. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on a client device directly, or in other ways.

Figure 6:
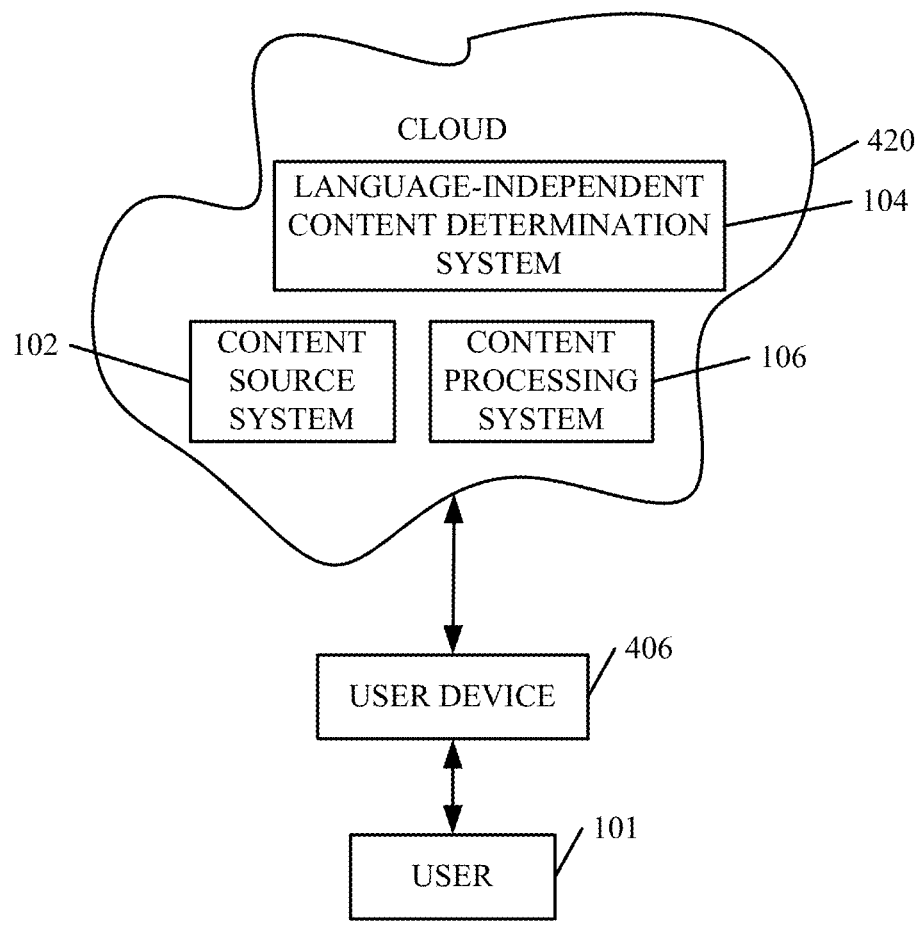
FIG. 6 shows one embodiment of the system in a cloud based architecture.

FIG. 6 shows language-independent content determination system 104, content processing system 106 and content source system 102 in a cloud computing environment. All of these systems are shown in cloud 420. User 101 accesses them as services provided through user device 406.

Figure 7:
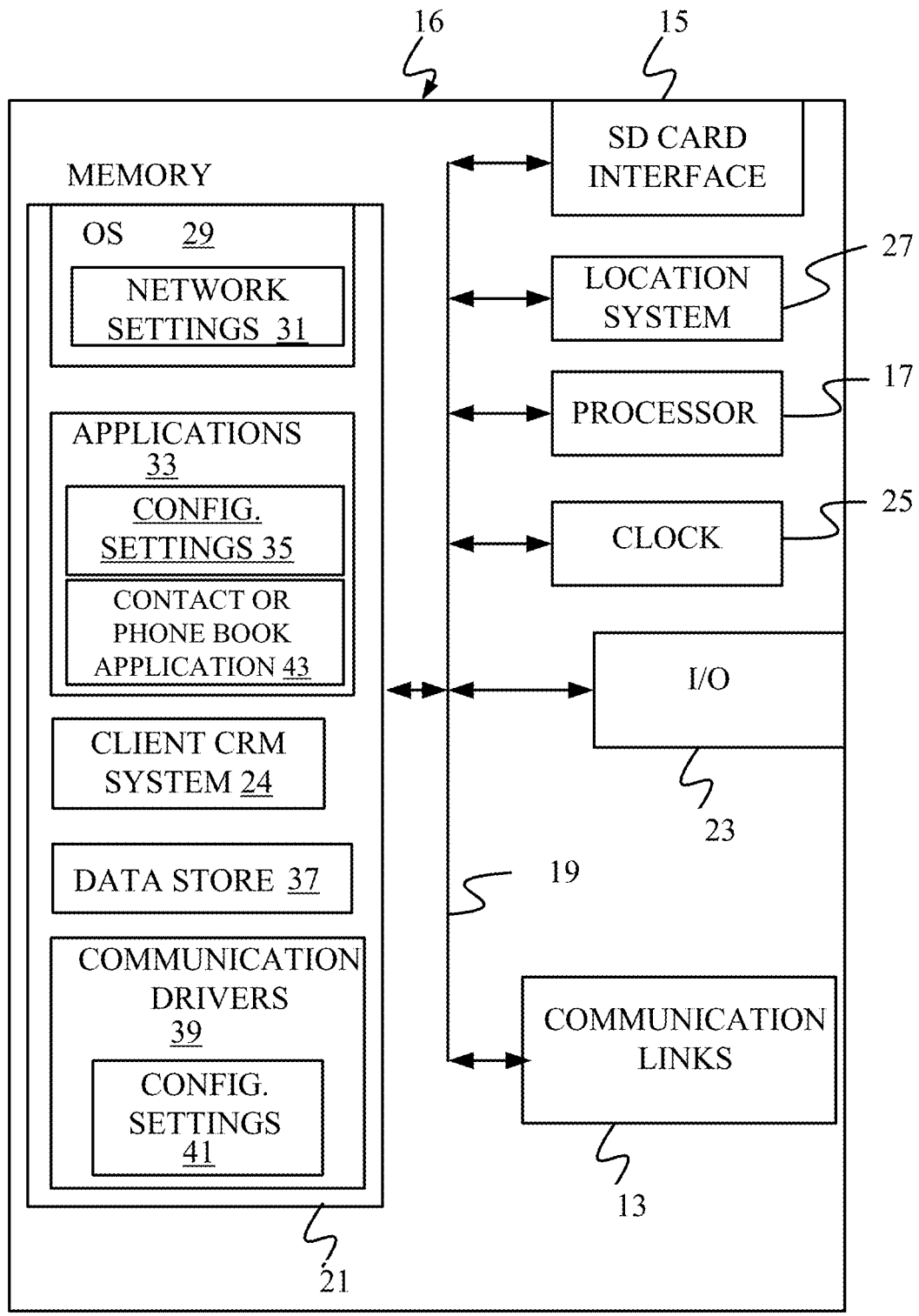
FIGS. 7-9 are illustrative mobile devices.
Figure 8:
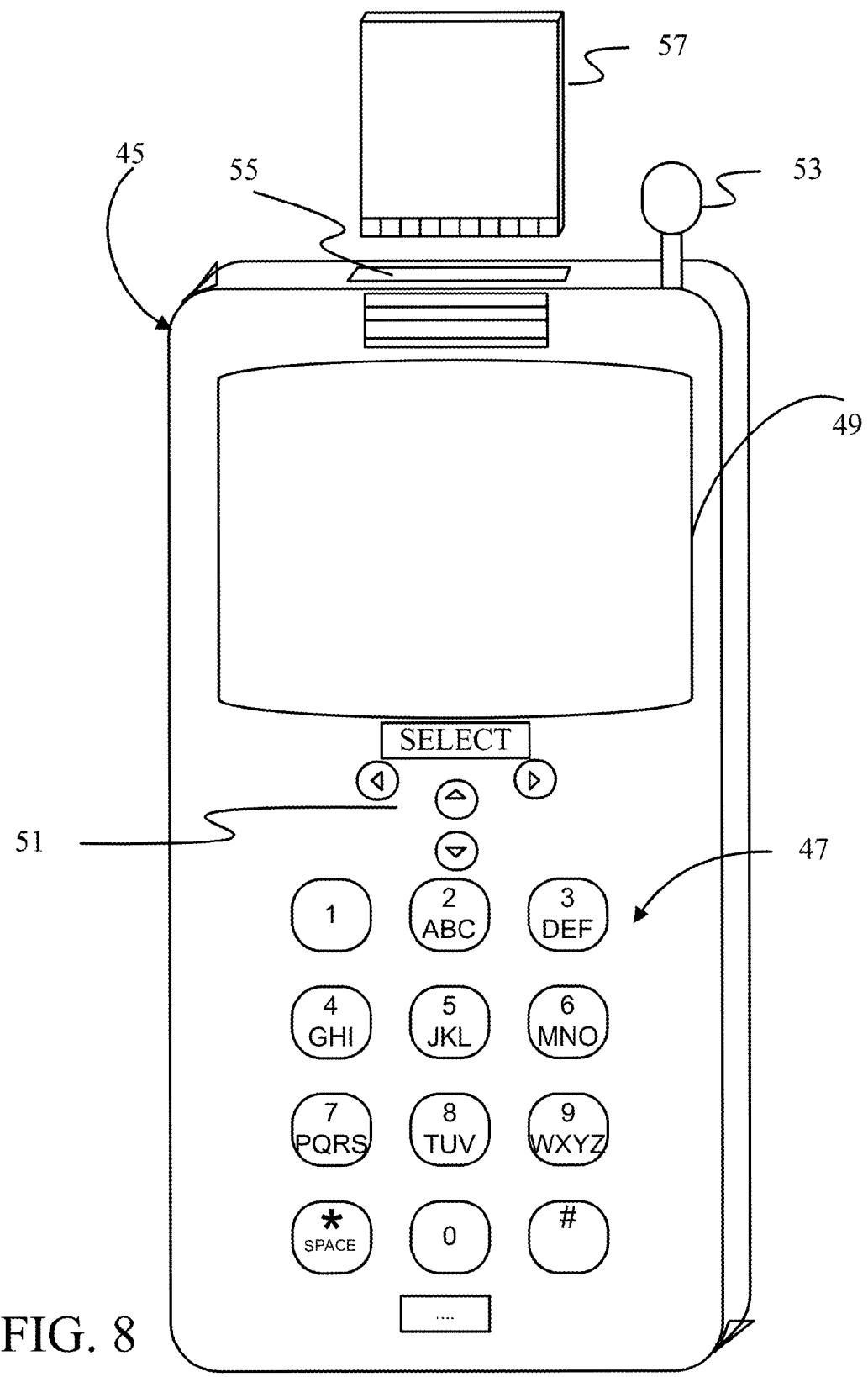
Figure 9:
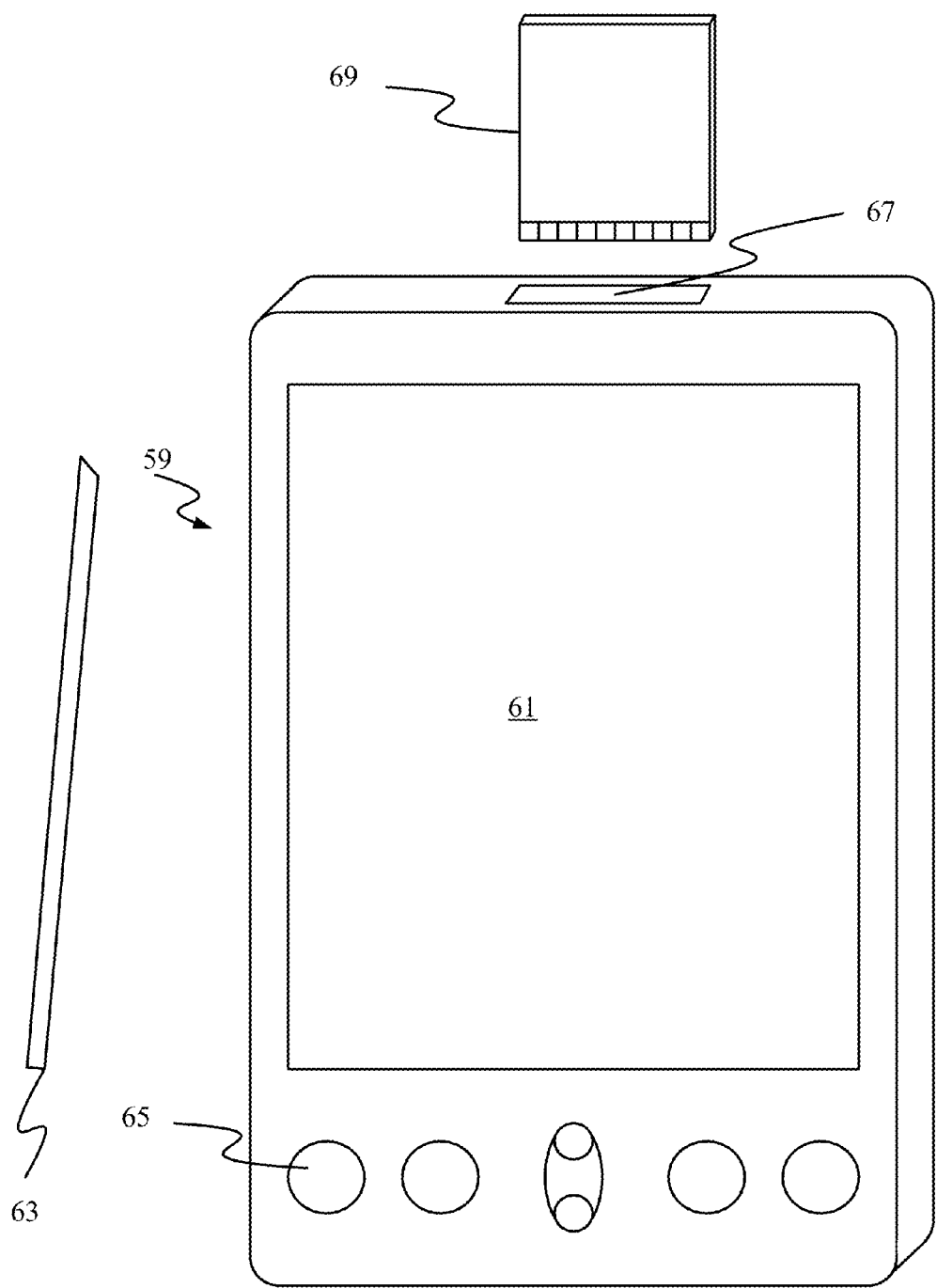

FIG. 7 is a simplified block diagram of one illustrative embodiment of a handheld or mobile computing device that can be used as user device (or client device) 406, in which the present system (or parts of it) can be deployed, or which can be used to access the present system. FIGS. 8 and 9 are examples of handheld or mobile devices.

FIG. 7 provides a general block diagram of the components of a client device 16 that can be user device 406 and can run components of environment 100 or that interacts with environment 100. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like environment 100) are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Portions of system 100, for example, can reside in memory 21. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIGS. 8 and 9 provide examples of devices 16 that can be used, although others can be used as well. In FIG. 8, a smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 9 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 16 are possible. Examples include tablet computing devices, music or video players, and other handheld computing devices.

Figure 10:
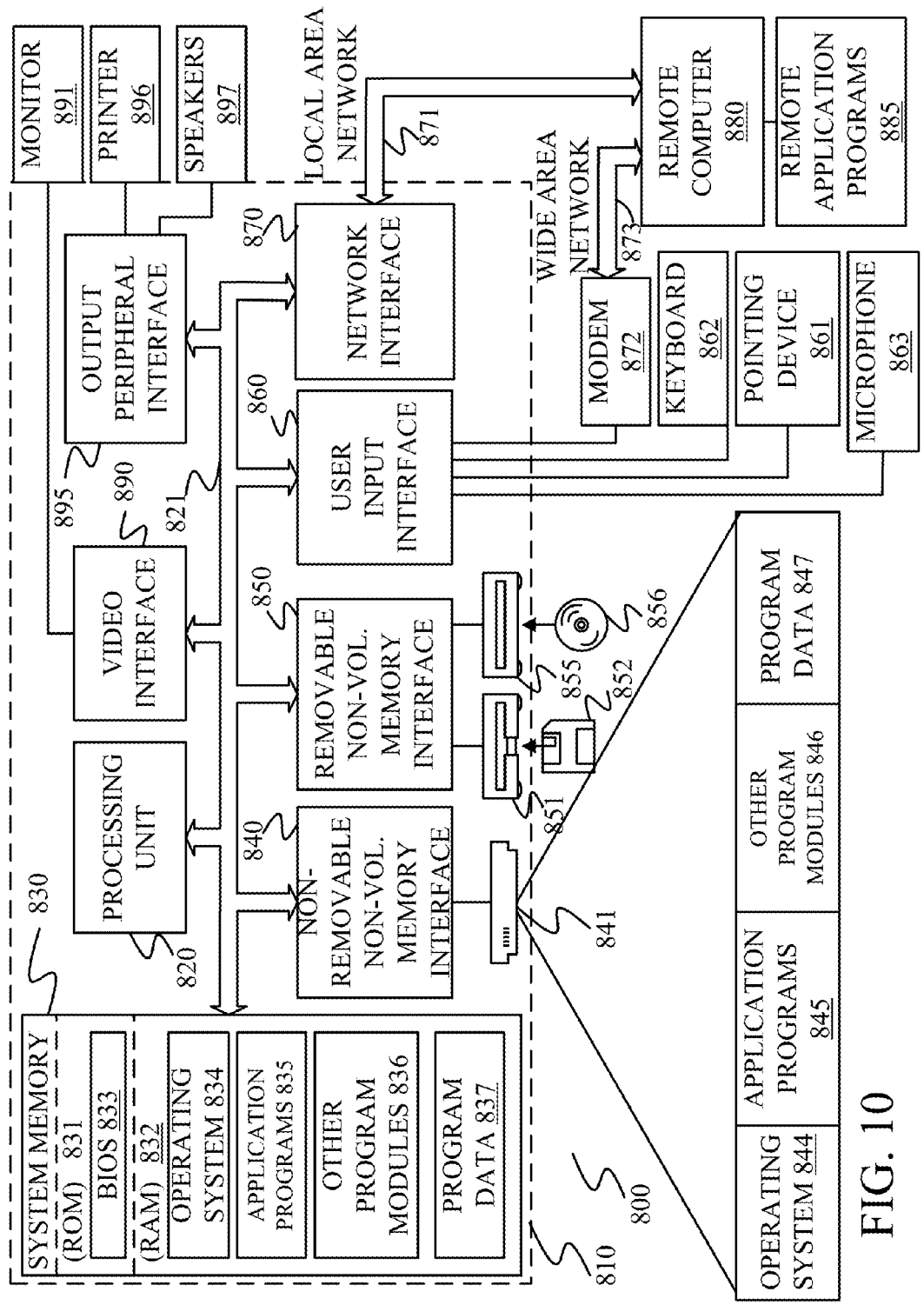
FIG. 10 is one embodiment of an illustrative operating environment.

FIG. 10 is one embodiment of a computing environment 800 in which environment 100 (for example) can be deployed. With reference to FIG. 10, an exemplary system for implementing some embodiments includes a general-purpose computing device in the form of a computer 810. Components of computer 810 may include, but are not limited to, a processing unit 820 (which can comprise processor 114), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
receiving electronic message a content source system, the electronic message including textual content;
accessing, from a rules store by a content determination component in a content determination system, a set of rules that define patterns that are used to identify content as sensitive content, each rule having segmented and un-segmented patterns that can be matched to textual content written in a segmented language and textual content written in an un-segmented language, respectively;
matching, by the content determination component, at least one textual content portion in the electronic message against the patterns in each rule, regardless of whether the at least one textual content portion in the electronic message is written in a segmented language or in an un-segmented language, to determine whether the at least one textual content portion in the electronic message is sensitive content;
generating, by the content determination component, a confidence score corresponding to the determination as to whether the at least one textual content portion in the electronic message is sensitive content, based on whether the at least one textual content portion in the electronic message matched a segmented pattern or an un-segmented pattern; and
applying, by a content processing system, a data dissemination rule to the at least one textual content portion in the electronic message based on the determination as to whether the at least one textual content portion in the electronic message is sensitive content and the corresponding confidence score, wherein applying the data dissemination, rule comprises at least one of:
blocking the at least one textual content portion in the electronic message from being sent to a potential recipient;
displaying a message indicating that the at least one textual content portion contains sensitive material and that the at least one textual content portion will be blocked from being sent to a potential recipient; or displaying a message indicating that the at least one textual content portion contains sensitive material and instructing the user how to proceed based on the data dissemination rule.

2. The computer-implemented method of claim 1 wherein generating a confidence score comprises:

generating, by the content determination component, a higher confidence score if the at least one textual content portion in the electronic message matched a segmented pattern and generating a lower confidence score if the at least one textual content portion in the electronic message matched an un-segmented pattern.

3. The computer-implemented method of claim 1 wherein applying a data dissemination rule to the at least one textual content portion, comprises:

if the at least one textual content portion in the electronic message is the first type of content with a sufficient corresponding confidence score, processing, by the content processing system, the at least one textual content portion in the electronic message according to a first set of processing rules; and otherwise, processing, by the content processing system, the at least one textual content portion in the electronic message according to a second set of processing rules.

4. The computer-implemented method of claim 1 wherein matching comprises:

matching, by the content determination component, the at least one textual content portion in the electronic message against both the un-segmented patterns and the segmented patterns in each rule.

5. The computer-implemented method of claim 4 wherein each pattern includes a main match pattern and a corroborating match portion and wherein matching comprises:

matching, by the content determination component, the at least one textual content portion in the electronic message first against the main match portion of a given pattern;

if the at least one textual content portion in the electronic message matches the main matching portion of the given pattern, then matching, by the content determination component, the at least one textual content portion in the electronic message against the corroborating match portion; and if the at least one textual content portion in the electronic message matches the corroborating match portion of the given pattern, then assigning a first confidence score to the match.

6. The computer-implemented method of claim 5 wherein the corroborating match portion of the given pattern has a plurality of corroborating patterns, and wherein matching the at least one textual content portion in the electronic message against the corroborating match portion comprises:

matching, by the content determination component, the at least one textual content portion in the electronic message against each of the plurality of corroborating match patterns; and if the at least one textual content portion in the electronic message matches more than one corroborating match pattern, increasing the confidence score.

7. The computer-implemented method of claim 1, wherein the content source system and the content processing system comprise parts of a same system.

8. The computer-implemented method of claim 1, wherein the electronic message comprises an email message and the at least one textual content portion in the electronic message comprises at least one of: an email body or an email attachment.

9. The computer-implemented method of claim 1 wherein matching comprises:

matching, by the content determination component, the at least one textual content portion in the electronic message against patterns in a rule that identify at least one of personal information, credit card information, or social security number information.

10. A content processing system, comprising:

a rules data store that includes a plurality of rules, each rule corresponding to a type of information and having a set of segmented patterns and a set of un-segmented patterns;

a content determination component receiving an electronic message having content and matching the content against the segmented patterns and the un-segmented patterns in each rule to determine whether the content includes the type of information corresponding to each rule, the content determination component assigning a confidence level to the determination of whether the content includes the type of information corresponding to a given rule based on whether the content matched a segmented pattern or an un-segmented pattern in the given rule;

a content processing system processing the content based on the determination of whether the content includes the type of information corresponding to the given rule, and applying a data dissemination rule comprises at least one of blocking the at least one textual content portion in the electronic message from being sent to a potential recipient, displaying a message indicating that the at least one textual content portion contains sensitive material and that the at least one textual content portion will be blocked from being sent to a potential recipient, or displaying a message indicating that the at least one textual content portion contains sensitive material and instructing the user how to proceed in accordance with the data dissemination rule; and a computer processor being a functional component of the system and being activated by the content determination component to facilitate matching and assigning a confidence level.

11. The content processing system of claim 10 wherein the content determination component matches the content against the segmented patterns and the un-segmented patterns regardless of whether the content is written in a segmented language, an un-segmented language or both a segmented and an un-segmented language.

12. The content processing system of claim 11 wherein the content determination component assigns a higher confidence level to the determination if the content matched a segmented pattern than if the content matched an un-segmented pattern.

13. The content processing system of claim 12 wherein each pattern in a rule has a main matching portion and a corroborating matching portion and wherein the content determination component matches the content first against the main matching portion and then, if the content matched the main matching portion, against the corroborating matching portion.

14. The content processing system of claim 13 wherein the corroborating matching portion includes a plurality of matching patterns.

15. The content processing system of claim 14 wherein the content determination component assigns an increased confidence level if the content matches more than one of the plurality of matching patterns in the corroborating matching portion.

16. A non-volatile memory device having computer readable instructions which, when executed, perform a method, comprising:

receiving an electronic message from a content source system, the electronic message including textual content;

accessing, from a rules store by a content determination component in a content determination system, a set of rules that define patterns that are used to identify content as sensitive content, each rule having segmented and un-segmented patterns that can be matched to textual content written in a segmented language and textual content written in an un-segmented language, respectively;

matching, by the content determination component, at least one textual content portion in the electronic message against the patterns in each rule, regardless of whether the at least one textual content portion in the electronic message is written in a segmented language or in an un-segmented language, to determine whether the at least one textual content portion in the electronic message is sensitive content;

generating, by the content determination component, a confidence score corresponding to the determination as to whether the at least one textual content portion in the electronic message is sensitive content, based on whether the at least one textual content portion in the electronic message matched a segmented pattern or an un-segmented pattern by generating a higher confidence score if the at least one textual content portion in the electronic message matched a segmented pattern and generating a lower confidence score if the at least one textual content portion in the electronic message matched an un-segmented pattern; and applying, by a content processing system, a data dissemination rule to the at least one textual content portion in the electronic message based on the determination as to whether the at least one textual content portion in the electronic message is sensitive content and the corresponding confidence score, wherein applying the data dissemination rule comprises at least one of:

blocking the at least one textual content portion in the electronic message from being sent to a potential recipient;

displaying a message indicating that the at least one textual content portion contains sensitive material and that the at least one textual content portion will be blocked from being sent to a potential recipient; or displaying a message indicating that the at least one textual content portion contains sensitive material and instructing the user how to comply with the data dissemination rule.

17. The non-volatile memory device of claim 16, wherein applying a data dissemination rule to the at least one textual content portion, comprises:

if the at least one textual content portion in the electronic message is the first type of content with a sufficient corresponding confidence score, processing, by the content processing system, the at least one textual content portion in the electronic message according to a first set of processing rules; and otherwise, processing, by the content processing system, the at least one textual content portion in the electronic message according to a second set of processing rules.

18. The non-volatile memory device of claim 16, wherein matching comprises:

matching, by the content determination component, the at least one textual content portion in the electronic message against both the un-segmented patterns and the segmented patterns in each rule.

19. The non-volatile memory device of claim 16, wherein the electronic message comprises an email message and the at least one textual content portion in the electronic message comprises at least one of: an email body or an email attachment.

\* \* \* \* \*